United States Patent Office 3,148,292
Patented Sept. 8, 1964

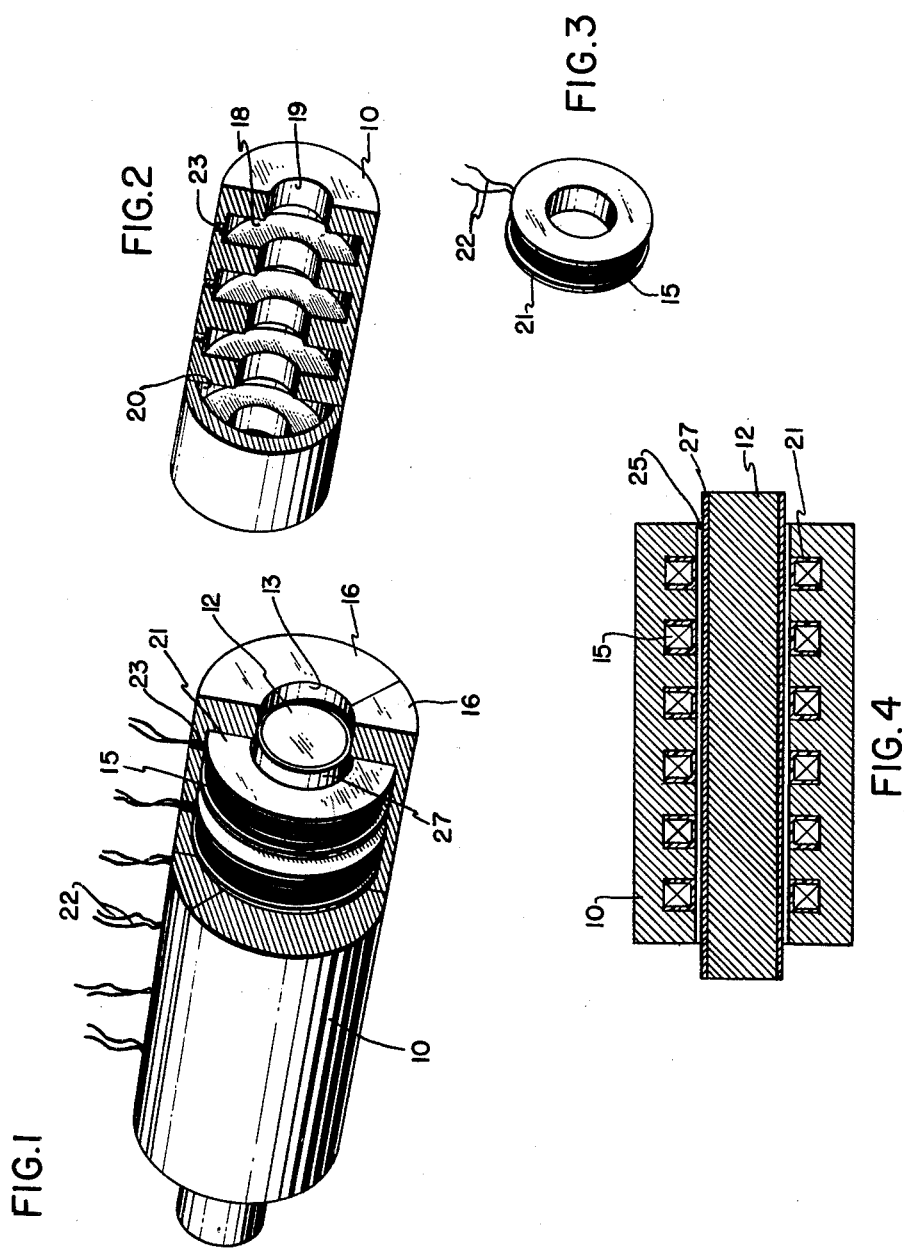

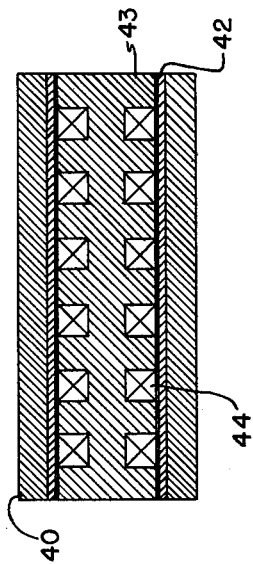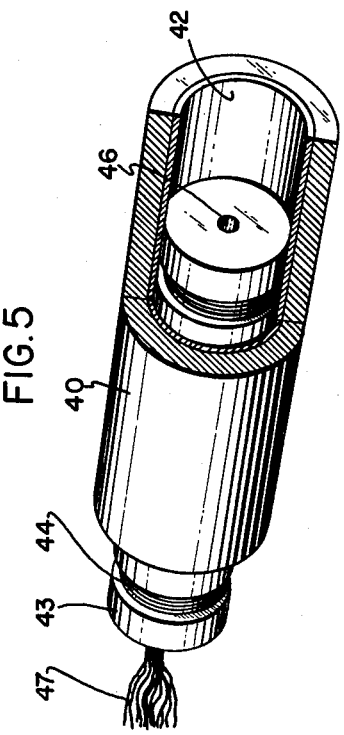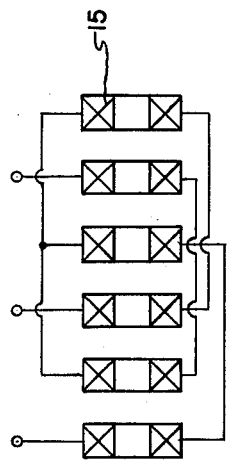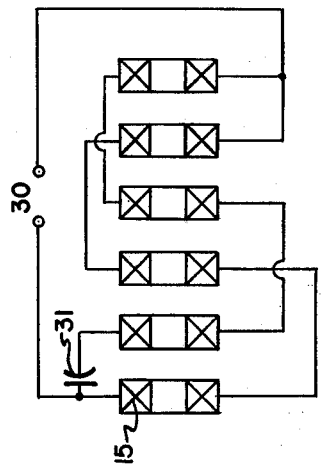

3,148,292
LINEAR EDDY-CURRENT ELECTROMAGNETIC
ACTUATOR
Robert M. Bergslien, Hazel Crest, and Joseph L. Radnik, Berwyn, Ill., assignors, by mesne assignments, to The Skinner Chuck Company, New Britain, Conn., a corporation of Connecticut
Filed Nov. 6, 1959, Ser. No. 851,326
9 Claims. (Cl. 310—13)

This invention generally relates to induction motors and is more specifically concerned with an actuator that produces rectilinear movement through utilization of induction motor principles.

It is a general object of this invention to provide an improved rectilinear electromagnetic actuator that produces smooth, virtually unlimited travel of the movable member without the assistance of conventional bearing supports for the movable member.

It is a further object of this invention to provide an improved rectilinear electromagnetic actuator that produces easily reversible, uniform tractive force on the movable member throughout its travel.

It is an additional object of this invention to provide an improved rectilinear electromagnetic actuator that is economical to manufacture and which produces smooth, reliable operation for extended periods of time.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a perspective view of a preferred embodiment of the actuator of this invention with a portion of the housing cut away;

FIG. 2 is a fragmentary perspective view of the housing of the actuator of FIG. 1;

FIG. 3 is a perspective view showing one of the coils of the actuator of FIG. 1;

FIG. 4 is a longitudinal cross section view of the actuator of FIG. 1;

FIG. 5 is a perspective view of an alternative embodiment of the improved actuator of this invention with a portion of the housing cut away;

FIG. 6 is a longitudinal cross section view of the actuator of FIG. 5;

FIG. 7 is a schematic diagram showing the coils of the improved actuator connected for single phase operation; and FIG. 8 is a schematic diagram showing the coils of the improved actuator connected for three phase operation.

Turning first to the embodiment of our invention shown in FIGS. 1–4, it is seen that the improved actuator generally comprises two relatively movable members, an outer, generally cylindrical housing member 10, and a plunger or inner member 12. Housing 10 is made from suitable magnetic material and is provided with a central longitudinally extending bore or passageway 13 about which are concentrically mounted a plurality (6 in the preferred embodiment) of identical bobbin-wound coils 15. As most clearly seen in FIGS. 2 and 3, housing 10 is comprised of two symmetrical mating halves 16, each of which is provided with a plurality of radial grooves 18 concentric with the axis of semicircular passageway 19. When housing halves 16 are fastened together in any desired manner, mating radial grooves 18 define annular grooves 20 in which are disposed coils 15 and semicircular passageways 19 cooperate to define central passageway 13. The desired number of turns of wire to form each coil 15 are placed on a bobbin 21 which is then trapped between housing halves 16 in a groove 20 with the wire ends 22 brought out through radially extending passageways 23 for connection to a suitable power source.

Plunger 12 generally comprises a cylindrical bar of suitable magnetic material dimensioned to fit within passageway 13 so as to define a small air gap 25 between the side walls of passageway 13 and the outer periphery of the plunger. A tubular sleeve 27 made of electrically conducting material such as copper or the like, is disposed about plunger 12 and secured thereto. Sleeve 27 occupies a substantial portion of the air gap and functions as an infinite number of shorted electrical conductors as hereinafter explained.

Coils 15 are connected to a polyphase source of electrical energy. As most clearly seen in FIG. 7, alternate coils are directly connected to a single phase source of alternating current 30 and the remaining coils are connected to the source through a phase-shifting device, such as capacitor 31. Thus, because adjacent coils are physically displaced and energized by an electrical current which is displaced in time from that of the adjacent coil, a traveling electromagnetic field is produced that moves along the axis of passageway 13. If desired, the same 6 coils can be connected to a three phase source, such as by the connections shown in FIG. 8.

In accordance with conventional induction motor principles, the traveling magnetic field induces currents by transformer action in the infinite number of shorted conductor turns represented by conductive sleeve 27. These currents react with the flux inducing the currents to produce a resultant force directed along passageway 13 which tends to cause relative movement of plunger 12 and housing 10. The direction of this force is determined by the phase sequence in which the coil groups are energized. If housing 10 is fixed in position by a suitable clamping arrangement (not shown), plunger 12 will move in the appropriate direction. However, if plunger 12 is held immovable, housing 10 will act as the movable element.

Utilization of smooth conducting sleeve 27 not only produces uniform and smooth travel of the movable member because of the infinite number of shorted conductor turns effect, but also enables the two relatively movable members to serve as mutual support and bearing members thereby eliminating the necessity for external support of the movable member by conventional bearings and pedestals. In addition, so long as the relatively movable members of actuator remain substantailly concentric, the lateral components of the tractive forces are automatically balanced thereby further minimizing the tendency of the actuator to malfunction. By utilizing a smooth continuous copper sleeve it is possible to reduce the air gap between the plunger and the housing to a minimum thereby insuring concentricity.

Of course, the thickness of the copper sleeve has a decided effect upon the magnitude of the force obtainable with the device of this invention. Since the sleeve is non-magnetic, it constitutes an air gap between the actuator members and thus largely determines the magnitude of available working flux. On the other hand, a thicker sleeve permits larger induced currents. It is therefore necessary to compromise the opposing considerations of air gap size and size of induced currents to determine the most desirable sleeve thickness. It is, of course, apparent that locking of the plunger in a particular position because of balanced electromatic forces is effectively prevented by utilizing a continuous conductive sleeve. To minimize edy current and hysteresis losses, both members of the linear actuator should be constructed of laminated or slotted magnetic material having high resistivity.

To simplify winding of the coils and mounting of these coils on the actuator member, the embodiment of FIGS. 5 and 6 can be utilized. It is therein noted that outer housing 40 is a continuous tube of suitable magnetic material in which is disposed the conductive sleeve 42 fastened to housing 40 by any suitable means. Plunger 43 is provided with a plurality (6 in the illustrated embodiment) of coils 44 which are wound directly in annular slots extending about the periphery of member 43. The connections to these coils are facilitated by central passageway 46 through which the coil ends 47 are brought. The operation, whether with three phase or single phase connection, is substantially identical to that described for the embodiment of FIGS. 1–4.

It is therefore apparent that we have provided an actuator which operates on induction motor principles to produce rectilinear movement of one of the actuator members. The construction is such that the need for bearing pedestals on other external supports is eliminated and smooth continuous movement of the movable member is obtained. The range of this movement is limited only by the length of one of the members. For example, the member carrying the conductive sleeve can be made as long as is necessary and the member carrying the windings can be designed to provide the necessary tractive force and speed in accordance with induction motor principles.

This device is exceptionally easy and economical to construct and provides long, trouble-free service with constant tractive forces produced throughout the range of movement.

As will be apparent to persons skilled in the art, various modifications and adaptations of the structure above described will become readily apparent without departure from the spirit and scope of the invention, the scope of which is defined in the appended claims.

What we claim is:

1. An electromagnetic actuator comprising first and second members formed of magnetic material, one of said members being an actuator and the other being an actuated member, said first member having a passageway extending therethorough, said second member being disposed within the passageway in said first member for longitudinal movement relative thereto and having a cross section dimensioned to define an air gap between said members, a continuous hollow conductor extending about the second member and throughout the length of the air gap, said conductor being secured to one of said members for movement therewith, a plurality of spacially displaced windings mounted on and distributed along the length of the other of said members adjacent the air gap, and means for energizing said windings from a source of electrical energy whereby a magnetic field is produced which travels along the passageway in said first member to induce an electric current in said hollow conductor to cause relative rectilinear movement between said members.

2. An electromagnetic actuator comprising first and second members formed of magnetic material, one of said members being an actuator and the other being an actuated member, said first member having a cylindrical passageway extending therethrough, said second member being disposed within said cylindrical passageway for axial movement relative thereto and having a generally circular cross section dimensioned to define an air gap between said first and second members, a continuous tubular conductor disposed in and extending throughout the length of said air gap, said conductor being positioned about said second member and secured to one of said members for movement therewith, a plurality of annular grooves formed in the other of said members concentric with the cylindrical passageway and evenly distributed along the length thereof, a coil winding disposed in each of said grooves, and means for energizing the plurality of windings from a source of electrical energy whereby a magnetic field is produced which travels along the air gap between said first and second members to induce an electric current in said tubular conductor to cause relative rectilinear movement between said members.

3. An electromagnetic actuator comprising first and second members formed of magnetic material, one of said members being an actuator and the other being an actuated member, said first member having a cylindrical passageway therein, said second member being cylindrical and disposed within the cylindrical passageway in said first member for axial movement relative thereto and being dimensioned to define an air gap between said first and second members, a continuous tubular electrically conducting sleeve disposed in and extending throughout the length of said air gap, said conducting sleeve being disposed about and secured to said second member for movement therewith, a plurality of spacially displaced windings mounted on and distributed along the length of said first member coaxial with the passageway, and means for energizing said windings from a source of electrical energy whereby a magnetic field is produced which travels along the air gap between said first and second members to induce an electric current in said conductive sleeve to cause relative movement between said first and second members.

4. An electromagnetic actuator comprising first and second members, one of said members being an actuator and the other being an actuated member, said first member having a cylindrical passageway therein, said second member disposed within the cylindrical passageway in said first member for axial movement relative thereto and having a cross section dimensioned to define an air gap between said first and second members, a continuous tubular conductive sleeve disposed about said second member and extending throughout the length of said air gap, said sleeve being secured to said first member for movement therewith, a plurality of annular grooves formed in and distributed along the length of said second member and concentric with the passageway in said first member, a coil winding disposed in each of said annular grooves, and means for energizing the windings from a source of electrical energy whereby a magnetic field is produced which travels along the air gap between said first and second members to induce an electric current in said tubular conductor to cause relative movement between said members.

5. An electromagnetic actuator comprising first and second members formed of magnetic material, one of said members being an actuator and the other being an actuated member, said first member having a cylindrical passageway formed therein, said second member being disposed within the cylindrical passageway in said first member for axial movement relative thereto and having a cross section dimensioned to define an air gap between first and second members, a continuous tubular conductor disposed about said second member and extending throughout the length of said air gap, said conductor being secured to said first member for movement therewith, a plurality of spacially displaced windings mounted on and distributed along said second member, and means for energizing said windings from a source of electrical energy whereby a magnetic field is produced which travels along the air gap between said first and second members to induce an electric current in said tubular conductor to cause relative movement between said first and second members.

6. An electromagnetic actuator comprising first and second members formed of magnetic material, one of said members being an actuator and the other being an actuated member, said first member having a cylindrical passageway formed therein, said first member having a plurality of annular grooves concentric with the axis of the passageway and formed on the inner surface of said first member, a coil winding disposed in each of said grooves, said second member having a cross section dimensioned to define an air gap between said first and second members, a continuous tubular conductor disposed in and extending along the length of said air gap, said conductor being secured to said second member for movement therewith, and means for energizing the coils from a source of electrical energy whereby a magnetic field is produced which travels along the air gap to produce an electric current in said tubular conductor to cause relative movement between said first and second members.

7. A long-stroke, electromagnetic actuator comprising first and second members formed of magnetic material, one of said members being an actuator and the other being an actuated member, said first member having a passageway extending therethrough, said second member being disposed within the passageway in said first member, a continuous sleeve of conducting material disposed about said second member and extending throughout the length of one of said members, said sleeve being secured to one of said members for movement therewith relative to the other of said members and being engageable with the other of said members as a continuous bearing forming the sole support of said one member relative to said other member throughout the range of relative movement in the passageway, a plurality of spacially displaced windings mounted on and distributed along the length of the other of said members, and means for energizing said windings from a source of electrical energy whereby a magnetic field is produced which travels along the passageway in said first member to induce an electric current in said continuous sleeve to cause relative rectilinear movement between the members.

8. The electromagnetic actuator as set forth in claim 7 wherein the passageway in said first member is circular transversely, said second member is a rod, and said sleeve is a tube disposed in intimate contact with the outer periphery of the rod.

9. The electromagnetic actuator as set forth in claim 8 wherein each of the plurality of spacially displaced windings is a coiled conductor disposed about the axis of the passageway in said first member.

References Cited in the file of this patent

UNITED STATES PATENTS

| | | |
|---|---|---|
| 680,797 | Mershon | Aug. 20, 1901 |
| 1,912,167 | Anderson | May 30, 1933 |

FOREIGN PATENTS

| | | |
|---|---|---|
| 468,292 | Germany | Nov. 9, 1928 |
| 398,917 | Great Britain | Sept. 28, 1933 |